(12) United States Patent
Abad et al.

(10) Patent No.: US 11,663,466 B2
(45) Date of Patent: May 30, 2023

(54) COUNTER DATA GENERATION FOR DATA PROFILING USING ONLY TRUE SAMPLES

(71) Applicant: Capital One Services, LLC, McLean, VA (US)

(72) Inventors: Fardin Abdi Taghi Abad, Seattle, WA (US); Reza Farivar, Champaign, IL (US); Vincent Pham, Champaign, IL (US); Kenneth Taylor, Champaign, IL (US); Mark Watson, Sedona, AZ (US); Jeremy Goodsitt, Champaign, IL (US); Austin Walters, Savoy, IL (US); Anh Truong, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 721 days.

(21) Appl. No.: 16/686,793

(22) Filed: Nov. 18, 2019

(65) Prior Publication Data

US 2020/0285958 A1 Sep. 10, 2020

Related U.S. Application Data

(63) Continuation of application No. 16/293,836, filed on Mar. 6, 2019, now Pat. No. 10,552,736.

(51) Int. Cl.
*G06F 40/10* (2020.01)
*G06N 3/08* (2023.01)
*G06N 3/045* (2023.01)
(52) U.S. Cl.
CPC .............. *G06N 3/08* (2013.01); *G06F 40/10* (2020.01); *G06N 3/045* (2023.01)

(58) Field of Classification Search
CPC ......... G06N 3/08; G06N 3/0454; G06F 40/10
See application file for complete search history.

(56) References Cited

U.S. PATENT DOCUMENTS

| | | | |
|---|---|---|---|
| 9,998,596 B1* | 6/2018 | Dunmire | H04M 3/5158 |
| 2014/0009156 A1* | 1/2014 | Doneva | G01R 33/543 |
| | | | 324/309 |
| 2015/0142607 A1 | 5/2015 | Yang et al. | |
| 2017/0177627 A1* | 6/2017 | Singh | G06F 16/353 |
| 2017/0366330 A1* | 12/2017 | Chan | H04L 7/0331 |
| 2019/0164173 A1* | 5/2019 | Liu | G06Q 30/0185 |
| 2019/0179925 A1* | 6/2019 | Meron | G06F 16/211 |
| 2019/0206576 A1* | 7/2019 | Shelton, IV | G06T 11/60 |

(Continued)

OTHER PUBLICATIONS

Babenko, B. et al., "Visual Tracking with Online Multiple Instance Learning" University of San Diego.

(Continued)

*Primary Examiner* — Kevin Ky
(74) *Attorney, Agent, or Firm* — Hunton Andrews Kurth LLP

(57) ABSTRACT

A method for generating a dual-class dataset is disclosed. A single-class dataset and a context dataset are obtained. The context dataset can be labeled. A model can be trained using the combination of the single-class dataset and the labeled context dataset. The model can be run on the context dataset. The data points that are classified the same as the data points included in the single-class dataset, can be removed from the labeled context dataset and added to the single-class dataset. These steps can be repeated until no data points are classified by the model.

20 Claims, 10 Drawing Sheets

(56) References Cited

U.S. PATENT DOCUMENTS

| | | | | |
|---|---|---|---|---|
| 2019/0245754 A1* | 8/2019 | Greene, Jr. | ............ | G06N 20/00 |
| 2019/0392001 A1* | 12/2019 | Carothers | .............. | G06N 3/084 |
| 2020/0065706 A1* | 2/2020 | Kao | ........................ | G06T 11/20 |
| 2020/0134510 A1* | 4/2020 | Basel | ..................... | G06N 3/084 |
| 2020/0285958 A1* | 9/2020 | Abad | .................. | G06N 3/0454 |
| 2021/0073661 A1* | 3/2021 | Matlick | .................. | G06N 20/00 |
| 2021/0181728 A1* | 6/2021 | Yamaguchi | ........ | G05B 19/4183 |

OTHER PUBLICATIONS

Thorsten Joachims, "Transductive Inference for Text Classification using Support Vector Machines" Universitat Dortmund, LS VIII.
Cheng, Z. et al., "Selecting High-Quality Negative Samples for Effectively Predicting Protein-RNA Interactions", https://www.ncbi.nlm.nih.gov/pmc/articles/PMC5374704/.
Allwein, E. L. et al., "Reducing Multiclass to Binary: A Unifying Approach for Margin Classifiers", Journal of Machine Learning Research, 1 (2000) 113-141.
Dumais, S. et al., "Inductive Learning Algorithms and Representations for Text Categorization", Microsoft Research.
"How to handle Imbalanced Classification Problems in Machine Learning", https://www.analyticsvidhya.com/blog/2017/03/imbalanced-classification-problem/.
Lewis, D. et al., "A Sequential Algorithm for Training Text Classifiers", AT&T Bell Laboratories.
Google, The Machine Learning Behind Android Smark Linkify, 2018, google (Year: 2018).

* cited by examiner

Single-Class Dataset 210

| Data Point | Class |
|---|---|
| (467) 259-8473 | Phone Number |
| (283) 357-4410 | Phone Number |
| (278) 579-2255 | Phone Number |
| (304) 489-0633 | Phone Number |
| (944) 526-9231 | Phone Number |
| (439) 860-9730 | Phone Number |
| (967) 249-9536 | Phone Number |
| (817) 653-2833 | Phone Number |
| (686) 993-7760 | Phone Number |
| (684) 794-0190 | Phone Number |

(Unlabeled) Context Dataset 220

| Data Point | Class |
|---|---|
| 444 205 1205 | |
| embezzling | |
| zigzagging | |
| (861) 459-6721 | |
| lumberjack | |
| (844) 891-1188 | |
| blackjacks | |
| maximizing | |
| 359 419-6184 | |
| (491) 324-0831 | |

*FIG. 2A*

Labeled Context Dataset 230

| Data Point | Class |
|---|---|
| 444 205 1205 | Not Phone Number |
| embezzling | Not Phone Number |
| zigzagging | Not Phone Number |
| (861) 459-6721 | Not Phone Number |
| lumberjack | Not Phone Number |
| (844) 891-1188 | Not Phone Number |
| blackjacks | Not Phone Number |
| maximizing | Not Phone Number |
| 359 419-6184 | Not Phone Number |
| (491) 324-0831 | Not Phone Number |

Dataset 240

| Data Point | Class |
|---|---|
| 444 205 1205 | Not Phone Number |
| embezzling | Not Phone Number |
| zigzagging | Not Phone Number |
| (861) 459-6721 | Phone Number |
| lumberjack | Not Phone Number |
| (844) 891-1188 | Phone Number |
| blackjacks | Not Phone Number |
| maximizing | Not Phone Number |
| 359 419-6184 | Not Phone Number |
| (491) 324-0831 | Phone Number |

*FIG. 2B*

First Refined Single-Class Dataset 250

| Data Point | Class |
|---|---|
| (467) 259-8473 | Phone Number |
| (283) 357-4410 | Phone Number |
| (278) 579-2255 | Phone Number |
| (304) 489-0633 | Phone Number |
| (944) 526-9231 | Phone Number |
| (439) 860-9730 | Phone Number |
| (967) 249-9536 | Phone Number |
| (817) 653-2833 | Phone Number |
| (686) 993-7760 | Phone Number |
| (684) 794-0190 | Phone Number |
| (861) 459-6721 | Phone Number |
| (844) 891-1188 | Phone Number |
| (491) 324-0831 | Phone Number |

First Refined Labeled Context Dataset 260

| Data Point | Class |
|---|---|
| 444 205 1205 | Not Phone Number |
| embezzling | Not Phone Number |
| zigzagging | Not Phone Number |
| lumberjack | Not Phone Number |
| blackjacks | Not Phone Number |
| maximizing | Not Phone Number |
| 359 419-6184 | Not Phone Number |

*FIG. 2C*

First Refined Unlabeled Context Dataset 270

| Data Point | Class |
|---|---|
| 444 205 1205 | |
| embezzling | |
| zigzagging | |
| lumberjack | |
| blackjacks | |
| maximizing | |
| 359 419-6184 | |

Dataset 280

| Data Point | Class |
|---|---|
| 444 205 1205 | Phone Number |
| embezzling | Not Phone Number |
| zigzagging | Not Phone Number |
| lumberjack | Not Phone Number |
| blackjacks | Not Phone Number |
| maximizing | Not Phone Number |
| 359 419-6184 | Phone Number |

*FIG. 2D*

Second Refined Single-Class Dataset 290

| Data Point | Class |
|---|---|
| (467) 259-8473 | Phone Number |
| (283) 357-4410 | Phone Number |
| (278) 579-2255 | Phone Number |
| (304) 489-0633 | Phone Number |
| (944) 526-9231 | Phone Number |
| (439) 860-9730 | Phone Number |
| (967) 249-9536 | Phone Number |
| (817) 653-2833 | Phone Number |
| (686) 993-7760 | Phone Number |
| (684) 794-0190 | Phone Number |
| (861) 459-6721 | Phone Number |
| (844) 891-1188 | Phone Number |
| (491) 324-0831 | Phone Number |
| 444 205 1205 | Phone Number |
| 359 419-6184 | Phone Number |

Second Refined Labeled Context Dataset 300

| Data Point | Class |
|---|---|
| embezzling | Not Phone Number |
| zigzagging | Not Phone Number |
| lumberjack | Not Phone Number |
| blackjacks | Not Phone Number |
| maximizing | Not Phone Number |

*FIG. 2E*

Second Refined Unlabeled Context Dataset 310

| Data Point | Class |
|---|---|
| embezzling | |
| zigzagging | |
| lumberjack | |
| blackjacks | |
| maximizing | |

*FIG. 2F*

Confusion Matrix (300)

|  |  | Actual | |
|---|---|---|---|
|  |  | Positive Class | Negative Class |
| Predicted | Positive Class | True Positive | False Positive |
|  | Negative Class | False Negative | True Negative |

COUNTER DATA GENERATION FOR DATA PROFILING USING ONLY TRUE SAMPLES

CROSS REFERENCE TO RELATED APPLICATION

The subject application is a Continuation of U.S. application Ser. No. 16/293,836 filed Mar. 6, 2019, the contents of which is hereby incorporated by reference in its entirety.

BACKGROUND

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models (or classifiers) can involve training and fine-tuning the model parameters using input data.

Deep learning is a machine learning technique that teaches computers to learn by example. In deep learning, a computer model learns to perform classification tasks directly from images, text, or sound, i.e., data. Deep learning models can achieve state-of-the-art accuracy, sometimes exceeding human-level performance. Models are trained by using a large set of labeled data and neural network architectures that contain many layers. Most modern deep learning models are based on an artificial neural network.

SUMMARY

Binary classification is the act of classifying data points (or samples) between two known classes of data points, e.g., positive data points and negative data points. For example, data points including words and numbers can be classified into phone numbers and non-phone numbers. A deep learning model can be trained to become a binary classification model. Training binary classification models can occur by using a training dataset. Some training datasets include both classes of data points, e.g., positive and negative data points. However, single-class training datasets include only one class of data points, e.g., only positive data points. In order to effectively train a binary classification model, it is desirable to train the model using a dual-class dataset, which includes both classes of data points. Therefore, it is an object of this disclosure to describe a method for creating a dual-class dataset when only a single-class dataset is provided.

Accordingly, a method and system for generating a dual-class dataset are disclosed. In this method, a single-class dataset (i.e., the dataset including only one class of data points) is provided. Using various techniques, a dataset including context data points is obtained. Context data points are unlabeled data points which can belong to either one of the classes of data points. The context dataset can be labeled the same as the class of data points that are not included in the single-class dataset. A model can be trained using the combination of the single-class dataset and the labeled context dataset. Then, the model is run on the unlabeled context data points. The data points that are classified the same as the data points included in the single-class dataset can be removed from the labeled context dataset (to make the refined labeled context dataset) and added to the single-class dataset (to make the refined single-class dataset).

These steps can be repeated, i.e., a second model can be trained using the combination of the refined single-class dataset and the refined labeled context dataset. Then, the second model can be run on the refined unlabeled context dataset to classify the data points. The data points that are classified the same as the data points included in the refined single-class dataset can be removed from the refined context dataset and added to the refined single-class dataset. These steps can be repeated until the trained model is unable to remove any data points from the refined context dataset. What remains in the refined context dataset can be data points belonging to the class that is not included in the single-class dataset. A combination of the single-class dataset and the refined context dataset can include data points of both classes and be used to train a binary classification model.

In one embodiment, the dual-class dataset can include two types of samples. The first type of samples can be samples that one would be interested in identifying, e.g., phone numbers or social security numbers. The second type of samples can be samples that one would not be interested in identifying, e.g., addresses, names, etc. The single-class dataset can include the second type of samples.

In some embodiments, the combination of the single-class dataset and the refined context dataset can be a skewed dataset. In these embodiments, various oversampling and undersampling techniques can be used to create a balanced dataset. Additionally, a performance metric can be used to determine which technique can generate the dataset which trains the best performing model.

BRIEF DESCRIPTION OF THE DRAWINGS

FIGS. 2A-F show various datasets used in connection with the process flow.

DETAILED DESCRIPTION

Training a Model

Figure 1:
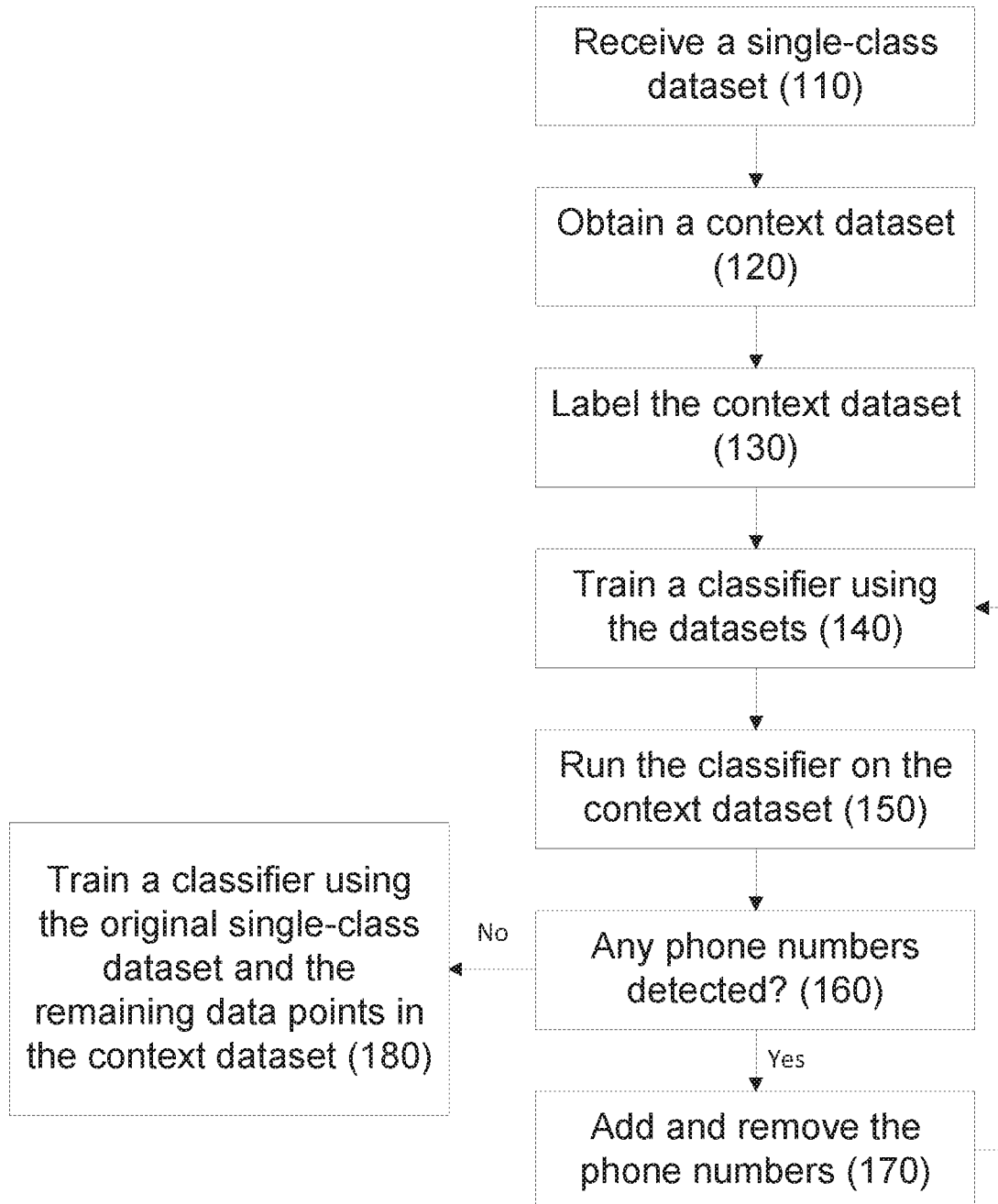
FIG. 1 shows an example process flow for generating a dual-class dataset using a single-class dataset.

In some embodiments, multiple datasets are used at different stages of creating classification models. These datasets can include a training dataset, a validation dataset, and a test dataset. Initially, the training dataset can be used to fit the parameters of the model. The training dataset can include an input vector and the corresponding answer vector (or the target or label). In this stage, the training dataset is fed to the model, and the model produces a result set, which can be compared with the target. Based on this comparison, the parameters of the model can be adjusted. After adjusting the parameters of the model, a validation dataset can be fed into the model to further refine the parameters of the model. The validation dataset provides an unbiased evaluation of the model fit on the training dataset while tuning the model's hyperparameters. Finally, the test dataset can be used to provide an unbiased evaluation of a final model fit on the training dataset.

Training a model (or classifier) is not limited to training using three datasets. In other words, a model (or classifier) can be trained using additional or fewer datasets.

Single-Class Datasets

Deep learning models learn from the data and the diversity of data. Although in theory, many datasets (or training datasets) can enable a deep learning algorithm to adjust a model for accurate predictions, in practice, not all of these datasets are adequate for certain training applications. For example, deep learning algorithms tend to produce unsatisfactory models when trained with single-class training datasets. These datasets include only one class of data points, and as a result, they do not provide sufficient information about the universe of data points. Specifically, deep learning models learn from the differences between the data points and the mistakes the model makes when making predictions. The differences and mistakes can be used to adjust the weights of the network. If all the samples belong to the same class of data points, there is no difference between the data points with respect to the class of the data points. Moreover, because there are no data points belonging to the other class, the model never makes any mistakes. Thus, the model does not learn from any mistakes. However, in binary classification models, it is very important to discover and predict both classes of data points. Inaccuracy in the prediction and discovery of data points of one class can be costly and undermine the model's accuracy and usefulness.

For example, a deep learning model can be trained to detect email addresses. If the model is trained using only email addresses, the model can make inaccurate predictions. For a model trained using email addresses and phone numbers, the model might only learn that if a given sample includes mostly numbers, it is not an email address; otherwise, it is an email address. If the model is trained using email addresses, phone numbers and words as training samples, the model might learn that only samples that have "@" signs are email addresses and other samples are not email addresses. In this way, the more negative examples a model is provided with, the better the model learns the features of the data and counter-data, and the better the model predicts the outcomes. This is one of the reasons why it is valuable to create a diverse dataset including counter-data to train a model.

Context Data Points

In an example embodiment, a single-class training dataset is provided. The single-class training dataset can include data points of only one class, e.g., positive data points. A deep learning model (or classifier) can be trained using the single-class training dataset. Once trained, the classifier can classify data points between the two classes, e.g., the classifier can determine whether each data point belongs to the positive class or negative class.

In an example embodiment, a server can obtain a variety of unclassified (or unlabeled) data points. These unclassified data points can be called the (unlabeled) context data points, and the dataset is containing them can be called the (unlabeled) context dataset. There can be various techniques for obtaining context data points. For example, the context data points can be obtained by using web scraping techniques, e.g., retrieving data from the Internet by scraping books, websites, newspapers, articles, and datasets. As another example, a random data generator can be used to generate the unclassified data points. As yet another example, a combination of web scraping and random data generation can be used to generate an unlabeled context dataset. As yet another example embodiment, internal company datasets can be used to provide the unclassified data point.

In one embodiment, the counter data is more valuable if it is similar to the desired type of data. Thus, one can focus on sources of data which have similar data points. For example, a model can be trained to detect phone numbers. One can use social security number and credit card number datasets as counter data. This can force the model to learn more features about the data.

Labeling Context Data Points

In an example embodiment, the (unlabeled) context dataset can be labeled. Specifically, all the context data points can be labeled the same as the class that is not included in the single-class training dataset. For example, if the training dataset includes only positive data points, all the context data points can be labeled as negative. After labeling, these data points are called the labeled context data points, and the dataset is containing them can be called the labeled context dataset.

In an example embodiment, a classifier can be trained using the combination of the single-class training dataset (i.e., positive data points) and the labeled context dataset (i.e., negative data points). Once trained, the server can run the classifier on the unlabeled context dataset. The classifier can classify and label some of the data points as positive and the other data points as negative. The positive data points can be added to the single-class training dataset (to make the refined single-class training dataset) and removed from the context dataset. After these operations, the data points remaining in the labeled or unlabeled context datasets can be called the refined labeled or unlabeled context data points. The datasets including these data points can be called the refined labeled or unlabeled context datasets.

In an example embodiment, some of the steps discussed in the previous paragraph can be repeated, i.e., another (or the same) classifier can be trained using the refined single-class training dataset (i.e., positive data points) and the refined labeled context dataset (i.e., negative points). Once trained, one can run the classifier on the refined unlabeled context dataset. The classifier can classify some of the data points as positive and the other data points as negative. The positive data points can be added to the refined single-class training dataset and removed from the refined labeled or unlabeled context datasets. This step can be repeated several times. For example, one can repeat this step until the classifier does not identify any positive data points in the refined unlabeled context dataset.

At this point, the data points that are remaining in the refined context dataset can be considered true negative data points. These data points can be dissimilar to the original positive data points. The combination of the original single-class training dataset and the refined context dataset can be used to train a new classifier (or the same classifier).

FIG. 1 shows an example process flow 100 for generating a dual-class dataset using a single-class dataset. FIGS. 2A-F show various datasets used in connection with the process flow 100. In step 110, a single-class dataset 210 is provided, e.g., the server can receive the single-class dataset. In this example embodiment, the single-class dataset 210 includes ten data points. Each one of the data points is a phone number, and as such, can be labeled as "Phone Number." In step 120, a context dataset 220 can be obtained. For example, the context dataset 220 can be obtained by scraping the Internet for ten letter words and ten-digit numbers. Initially, the context dataset 220 is not labeled. This context dataset 220 can be called the unlabeled context dataset 220.

According to an example embodiment, in step 130, all the data points of the unlabeled context dataset 220 can be labeled as "Not Phone Number." This dataset can be called the labeled context dataset 230. In step 140, a classifier can be trained using the combination of the single-class dataset 210 (data points labeled as "Phone Number") and the labeled context dataset 230 (data points labeled as "Not Phone Number").

After training, in step 150, the classifier can be run on the unlabeled context dataset 220. In this example embodiment, the classifier labeled three of the data points in the unlabeled context dataset 220 as "Phone Number" and the rest as "Not Phone Number." See dataset 240. Accordingly, in step 160, the server running the process determines that three phone numbers are detected. Thus, the process advances to step 170. In step 170, the three data points can be added to the single-class dataset to generate the first refined single-class dataset 250. Also, the three data points can be removed from the context dataset 220 to generate the first refined labeled context dataset 260.

In an example embodiment, the step 140 can be repeated using the refined datasets. Thus, in step 140, a classifier can be trained using the first refined single dataset 250 and the first refined labeled context dataset 260. In step 150, the classifier can be run on the first refined unlabeled context dataset 270. In this example embodiment, the classifier can label two of the data points in the first refined unlabeled context dataset 270 as "Phone Number" and the rest as "Not Phone Number." See dataset 280. Accordingly, in step 160, the server determines that the process can advance to step 170 because two phone numbers are detected. In step 170, the two data points can be added to the first refined single-class dataset 250 to generate the second refined single-class dataset 290. Also, the two data points can be removed from the first refined labeled context dataset 260 to generate the second refined labeled context dataset 300.

In an example embodiment, the step 140 can be repeated until the classifier does not recognize any data point as "Phone Number" in the second refined context dataset. For example, if a classifier is trained on the second refined single-class dataset 290 and the second refined labeled context dataset 300, the classifier will not pick any data points as "Phone Number" in the second refined unlabeled context dataset 310. Thus, the process can advance to step 180. In this step, the second refined labeled context dataset 300 and the single-class dataset 210 can be used to train a classifier. The second refined labeled context dataset 300 can provide a dataset of all "Not Phone Number" data points which can be useful in training a new or the same classifier.

Balancing an Imbalanced Dataset

In an example embodiment, the combination of the original single-class training dataset and the refined context dataset can be an imbalanced or skewed dataset. Datasets that are imbalanced or include a skewed class distribution can be insufficient for training classification models. In these datasets, there usually is a majority class, and at least one minority class and the number of majority class members can significantly exceed those of the minority class members. This phenomenon often occurs in fraud detection, medical diagnosis or spam classification applications. For example, in fraud detection applications, for every fraudulent transaction, there can be hundreds or even thousands of properly authorized transactions. As another example, in medical diagnosis cases, the number of patients with a rare abnormality can be far fewer than the number of healthy patients. As such, a dataset of financial transactions or medical files can be imbalanced.

Machine learning or deep learning algorithms tend to produce unsatisfactory models when trained with imbalanced training datasets because an imbalanced training dataset does not provide the necessary information about the minority class (or classes). If an imbalanced training dataset is fed into a model, the output will be biased, and in many cases result in always predicting the majority class. In other words, a model trained with an imbalanced dataset tends to be more sensitive to detecting the majority class and less sensitive to the minority class. For example, in the case of the fraud detection model, where most of the transactions are not fraudulent, if the model is trained with imbalanced data, the model might predict every transaction as genuine. In these models, it is very important to discover the rarely occurring minority class members. Failure to discover these members can be costly and undermine the model's accuracy and usefulness. For example, failure to detect a fraudulent transaction can cost the financial institution money, and failure to detect rare cancer can be deadly for the patient.

Various approaches have been introduced to deal with class imbalance issues. Some of these approaches are algorithmic approaches, and others are data-level approaches. Concerning the data-level approaches, it has been observed that machine learning or deep learning algorithms overcome class imbalance issues when the number of members of each class is roughly equal. Therefore, it is desirable to train classification models using balanced training datasets. Depending on the application, a balanced dataset can have different class distributions. For example, in some applications, a balanced dataset can have an even distribution between class members, e.g., 50% to 50%. As another example, in some applications, a balanced dataset can have at 60% to 40% distribution or even 90% to 10%.

Many techniques have been proposed to deal with imbalanced datasets in training classification models. Cost-sensitive learning and sampling are two of these techniques. The first approach is cost-sensitive learning. When determining the performance of a machine learning or deep learning algorithm, the accuracy of predictions seems to be a factor. However, it is helpful to consider additional factors because some types of misclassifications may be worse than others. For example, in fraud applications, misclassifying a genuine transaction as fraudulent can be inconvenient, but would not impose a financial burden on the company. Yet, misclassifying a fraudulent transaction as a genuine transaction can cause financial liability. As such, cost-sensitive learning takes the cost of every type of error into account so as to avoid the costliest of errors.

For example, in some applications, no cost is associated with correctly classifying an outcome correctly, e.g., correctly identifying a cancer patient as cancer or correctly identifying a healthy person as healthy. But incorrectly classifying a minority class member can be costlier than incorrectly identifying a majority class member, e.g., misclassification of a cancer patient as healthy can be costlier. Cost-sensitive learning seeks to minimize the total cost, and when misclassification costs are known as the best metric for evaluating classifier performance can be the total cost.

However, the cost-sensitive approach cannot be applied to every application because the misclassification costs are often unknown. Moreover, this approach cannot be implemented in every learning algorithm. In other words, the cost-sensitive approach is not a wrapper-based method as it has to be embedded in the learning algorithm. Therefore, for many applications, sampling seems to be the more appropriate approach.

There are various sampling techniques for balancing an imbalanced training dataset (or dataset). Oversampling, undersampling or a combination of the two are few examples of such sampling techniques. These techniques can be used to change the class distribution of a training dataset or to correct a bias in the training dataset.

In an example embodiment, oversampling can multiply the minority class members in the training dataset so that the training dataset is balanced (or oversampling can multiply selection of the minority class members so that a balanced sample dataset is collected). In an example embodiment, undersampling can discard the majority class members in the training dataset so that the training dataset is balanced (or undersampling can decrease selection of the majority class members so that a balanced sample dataset is collected).

For example, a dataset can include 100 variable data points. A feature of each data point can be gender. As such, these variables can be distributed between two known classes: men and women. Assume that the ratio of men to women is 9:1, i.e., for every 9 men, there is 1 woman in the dataset. Oversampling in this context can include copying the women data points 8 times so that the dataset is evenly distributed between men and women, i.e., the distribution ratio is 1:1. Undersampling in this context can include sampling only 1 man for every selection of a woman, e.g., sampling 10 men and 10 women. In the undersampling scenario, the ratio is 1:1.

There are several benefits to utilizing sampling techniques in addressing imbalanced datasets. Many highly skewed datasets are enormous, and the size of the training set must be reduced in order for learning to be feasible. In these cases, undersampling seems to be a reasonable, and valid, strategy.

In addition to these techniques, there are other sampling techniques for addressing the problem of the imbalanced dataset. For example, hybrid sampling techniques which combine oversampling and undersampling, Random Under-Sampling, Random Over-Sampling, Cluster-Based Over Sampling, Synthetic Minority Over-sampling Technique and Modified synthetic minority oversampling technique are a few examples of these sampling techniques.

Performance of the Dataset

In an example embodiment, a performance or evaluation value can be determined for each dataset generated for training the model. For example, after generating negative data points, a training dataset can be generated. The training dataset can be imbalanced. If so, a plurality of balancing techniques can be implemented, e.g., oversampling and undersampling, to balance the training dataset. After balancing the training dataset, a performance value or a performance metric can be calculated for each training dataset to determine which training dataset is superior. Subsequently, the superior dataset can be used for training a classifier.

The performance or evaluation value can be a measure of the efficacy of a model trained with the dataset. There are several performance metrics for measuring a classification model's performance. Accuracy, precision, recall, specificity, and area under the curve are some examples of these performance metrics.

In an example embodiment, the model is tested with a test dataset to evaluate the model's performance. The targets can be positive or negative. The model's predictions can be identified as true positives, true negatives, false positives, and false negatives. A true positive prediction is a prediction that correctly identifies a positive data point. A true negative prediction is a prediction that correctly identifies a negative data point. A false positive prediction is a prediction that incorrectly identifies a negative data point as positive. A false negative prediction is a prediction that incorrectly identifies a positive data point as negative.

Figure 3:
FIG. 3 shows a confusion matrix for a cancer detection model according to an example embodiment.

FIG. 3 shows a confusion matrix 300 for a cancer detection model according to an example embodiment. In this example embodiment, the cancer detection model is trained to detect cancer in patients. In order to evaluate the performance of the model, the model's predictions are classified into four groups: true positive, false positive, true negative and false negative. A true positive prediction identifies a cancer patient as cancer or positive. A true negative prediction identifies a healthy person as healthy or negative. A false positive prediction (mis)identifies a healthy person as cancer. A false negative prediction (mis)identifies a cancer patient as healthy.

Ideally, a model should not make any false or inaccurate predictions. However, in practice, every model can make inaccurate predictions. Depending on the specific needs or applications of the model, the goal of the model is to minimize one or both of false positive and false negative predictions for the model. For example, for cancer detection, minimizing the false negatives can be the objective because the consequence of misdiagnosing a cancer patient is severe. However, for spam emails, minimizing the false positives is desirable because incorrectly identifying an important email as spam can be consequential.

In an example embodiment, an "accuracy" rate can be used as the performance metric for the trained model. To calculate the accuracy rate, the number of correct predictions made by the model can be divided by all predictions made by the model, i.e., the fraction of true positives plus true negatives over the true and false positives plus the true and false negatives. The accuracy rate is the most useful when the classes of data are equally divided. However, the accuracy rate might not provide a useful metric for imbalanced datasets.

In an example embodiment, a "precision" rate can be used as the performance metric for the trained model. The precision rate is a measure that indicates what proportion of the positive predictions are correct predictions. In order to calculate the precision rate, one has to divide the true positive predictions by the total number of positive predications (i.e., true and false positives).

In an example embodiment, a "recall" rate can be used as the performance metric for the trained model. Recall rate indicates what proportion of the total positive data points were identified by the model as positives (i.e., true positives). The total positive data points are the sum of true positives and false negatives. Therefore, in order to calculate the recall rate, one has to divide the number true positives by the sum of true positives and false negatives.

The recall rate can measure a model's performance with respect to false negatives, i.e., how many were missed. On the other hand, the precision rate can measure a model's performance with respect to false positives, i.e., how many were caught. The precision rate can be about being precise. For example, even if the model captures only one cancer case, and the model captured it correctly, then the model is 100% precise. The recall rate is more about capturing all cases that have "cancer" with the answer as "cancer." So, if the model always predicts every case as "cancer," the model has a 100% recall rate.

In an example embodiment, "specificity" rate can be used as the performance metric for the trained model. The specificity rate can indicate what proportion of the total negative data points were predicted by the model as negatives (i.e., true negatives). The total negative data points are the sum of true negatives and false positives. Therefore, in order to calculate the specificity rate, one has to divide the number true negatives by the sum of true negatives and false positives. The specificity rate is the exact opposite of the recall performance metric.

Figure 4:
FIG. 4 shows a confusion matrix for a cancer detection model according to an example embodiment.

FIG. 4 shows a confusion matrix 400 for a cancer detection model according to an example embodiment. In this example embodiment, the records for 1000 patients is fed to the cancer detection model. In this dataset, there are 7 cancer patients and 993 healthy individuals. The model has predicted 8 cancer patients and 992 healthy individuals. In the model's predictions, there are 6 true positive predictions, 2 false positive predictions, 991 true negative predictions, and 1 false negative prediction. The accuracy rate for this model is 997 divided by 1000 or 99.7%. The precision rate for this model is 6 divided by 8 or 75%. The recall rate for this model is 6 divided by 7 or 85.7%. The specificity rate for this model is 991 divided by 993 or 99.7%.

In an example embodiment, the performance metric can be a misclassification rate of the model. To calculate the misclassification rate, the number of incorrect predictions made by the model can be divided by all predictions made by the model, i.e., the fraction of false positives plus false negatives over the true and false positives plus the true and false negatives.

In an example embodiment, the performance metric can be a prevalence rate of the model. The prevalence rate indicates how many members of a class are in a dataset. The prevalence rate can be calculated by dividing the number of class members by the number of all of the variables.

In an example embodiment, the performance value can be the calculated value according to one of the accuracy, precision, recall or specificity rate. In another example embodiment, the performance value can be a combination of two or more values calculated according to these performance metrics. For example, the performance value can be a weighted average of the values calculated according to the precision and recall rates, e.g., the sum of the precision and recall rates divided by 2. In this example, each of the values calculated according to the precision and recall rates is given the same weight. In the example embodiment of FIG. 4, if the precision and recall rates are weighted equally, the weighted average of these metrics is 80.3%. The weighted average of the values calculated according to the precision and recall rates can be the F-score for the model.

As another example, the performance value can be a harmonic mean of the precision and recall rates. That is 2×(precision×recall)+(precision+recall).

This performance value can be the F1 score for the model. The harmonic mean for two nearly equal numbers is a number close to the average of the two numbers. However, when the numbers are different, the harmonic mean is closer to the smaller number as compared to the larger number. In the example embodiment of FIG. 4, the harmonic mean of the precision and recall rates is 79.9%.

In an example embodiment, the performance value can be an area under a curve. The curve can be a receiver operating characteristics (ROC) curve. The ROC curve is a graph showing the performance of a classification model at all classification thresholds. This curve plots two parameters: True Positive Rate ("TPR") and False Positive Rate ("FPR"). The TPR is the same as the recall rate. It is equal to the number of true positive predictions divided by the total positives, i.e., the true positives plus false negatives. The FPR is defined as the number of false positive predictions over the total negative predictions, i.e., false positives plus true negatives.

A ROC curve is a graph which has FPR on its x-axis and TPR on its y-axis at different classification threshold values of the model. A classification model can determine a prediction probability which indicates the system's certainty that the given observation belongs to the positive class. The user can define a classification threshold value for predictions of the model. This threshold value specifies a minimum prediction probability for the model to assign an observation to the positive class. Any observation with prediction probability higher than the threshold value can then be predicted as the positive class and probability lower than the threshold value can be predicted as the negative class. By lowering the classification threshold for a model, the likelihood of classifying an observation as positive increases, and thus, the numbers of both false positives and true positives increases.

The area under the ROC curve is known as "AUC." AUC provides an aggregate measure of performance across all possible classification thresholds. Because TPR and FPR range between 0 and 1, AUC ranges in value from 0 to 1. An AUC of 0 indicates that all the predictions of the model are wrong and an AUC or 1.0 indicates that all of the predictions of the model are accurate. Since a random classifier predicts half of the outcomes correctly, an AUC value close to 0.5 indicates a relatively inaccurate classifier. AUC can provide a useful performance value because it is scale-invariant and classification-threshold-invariant.

In an example embodiment, the performance metric can be the logarithmic loss ("log loss") metric. Log loss measures the performance of a classification model where the prediction input is a probability value between 0 and 1. The goal of a model is to minimize this value.

In an example embodiment, the performance value can be determined based on an F-Beta score. The F-Beta score can be calculated as follows:

$$[(1+\beta^2) \times (\text{precision} \times \text{recall})] \div [(\beta \times \text{precision}) + \text{recall})]$$

In an example embodiment, the performance metric can be the Positive Predictive Value (PPV). PPV takes prevalence into account.

In an example embodiment, the performance metric can be the Null Error Rate (NER). NER is an indicator of how often the model would be wrong if it always predicted the majority class. This can be a useful baseline metric to compare a classifier against.

In an example embodiment, the performance metric can be the Cohen's Kappa. Cohen's Kappa can measure how well the classifier performed as compared to how well it would have performed simply by chance. In other words, a model will have a high Kappa score if there is a big difference between the accuracy rate and the NER.

Technical Implementation of the Server

Figure 5:
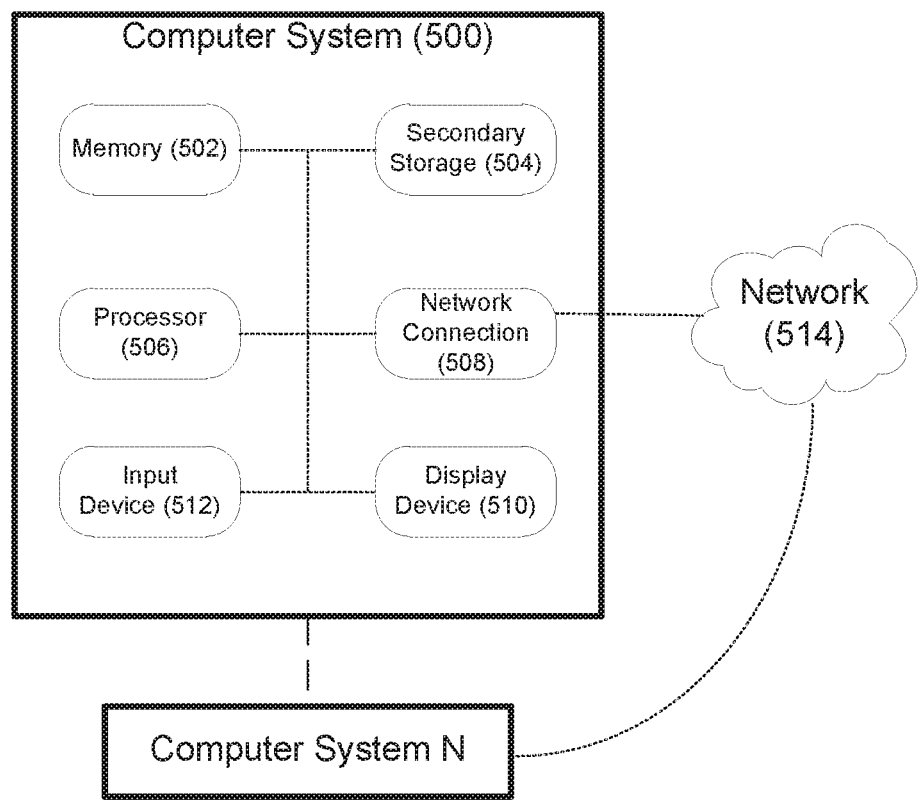
FIG. 5 illustrates exemplary hardware components for a server.

FIG. 5 illustrates exemplary hardware components of a server. A computer system 500, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 500, may run an application (or software) and perform the steps and functionalities described above. Computer system 500 may connect to a network 514, e.g., the Internet, or another network, to receive inquiries, obtain data, and transmit information and incentives as described above.

The computer system 500 typically includes a memory 502, a secondary storage device 504, and a processor 506. The computer system 500 may also include a plurality of processors 506 and be configured as a plurality of, e.g., bladed servers, or other known server configurations. The computer system 500 may also include a network connection device 508, a display device 510, and an input device 512.

The memory 502 may include RAM or similar types of memory, and it may store one or more applications for execution by processor 506. Secondary storage device 504 may include a hard disk drive, floppy disk drive, CD-ROM drive, or other types of non-volatile data storage. Processor 506 executes the application(s), such as those described herein, which are stored in memory 502 or secondary storage 504, or received from the Internet or another network 514. The processing by processor 506 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 500 may store one or more database structures in the secondary storage 504, for example, for storing and maintaining the information necessary to perform the above-described functions. Alternatively, such information may be in storage devices separate from these components.

Also, as noted, processor 506 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 500.

The input device 512 may include any device for entering information into the computer system 500, such as a touch-screen, keyboard, mouse, cursor-control device, microphone, digital camera, video recorder or camcorder. The input and output device 512 may be used to enter information into GUIs during the performance of the methods described above. The display device 510 may include any type of device for presenting visual information such as, for example, a computer monitor or flat-screen display (or mobile device screen). The display device 510 may display the GUIs and/or output from sub-system components (or software).

Examples of the computer system 500 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 500 is shown in detail, system 500 may use multiple computer systems or servers as necessary or desired to support the users and may also use back-up or redundant servers to prevent network downtime in the event of a failure of a particular server. In addition, although computer system 500 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 500, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A non-transitory computer-accessible medium having stored thereon computer-executable instructions for generating a dual-class dataset, wherein, when a computing hardware arrangement executes the instructions, the computing arrangement is configured to perform procedures comprising:
   a. accessing a first dataset including data points belonging to a first category of data points, wherein each data point in the first dataset is labeled as a first class data point;
   b. accessing a second dataset including data points belonging to the first category of data points and a second category of data points, wherein each data point in the second dataset is labeled as a second class data point;
   c. training a classification model using the first dataset and the second dataset;
   d. using the classification model, classifying each data point in the second dataset as belonging to one of the first category of data points or the second category of data points;
   e. for each data point in the second dataset classified as belonging to the first category of data points, removing the data point from the second dataset, adding the data point to the first dataset and labelling the data point as the first class data point;
   f. repeating steps (c)-(e), until the classification model does not classify any data point in the second dataset classified as belonging to the first category of data points; and
   g. generating the dual-class dataset using the first dataset and the second dataset.

2. The non-transitory computer-accessible medium of claim 1, wherein in repeating steps (c)-(e), each time a different classifier is trained and used to classify each data point in the second dataset.

3. The non-transitory computer-accessible medium of claim 1, further comprising generating the second dataset before step (b) by scarping data from Internet pages, Internet websites or databases.

4. The non-transitory computer-accessible medium of claim 1, wherein the first dataset includes data points representing fraudulent transactions.

5. The non-transitory computer-accessible medium of claim 1, wherein the first dataset includes data points representing phone numbers.

6. The non-transitory computer-accessible medium of claim 1, wherein the first dataset includes data points representing Social Security Numbers.

7. The non-transitory computer-accessible medium of claim 1, further comprising sampling the dual-class dataset according to a sampling technique.

8. The non-transitory computer-accessible medium of claim 7, wherein the sampling technique is undersampling or oversampling the data points in the first dataset.

9. The non-transitory computer-accessible medium of claim 7, wherein the sampling technique is undersampling or oversampling the data points in the second dataset.

10. The non-transitory computer-accessible medium of claim 7, wherein the sampling technique is Synthetic Minority Oversampling Technique, Modified Synthetic Minority Oversampling Technique, Random Undersampling or Random Oversampling.

11. The non-transitory computer-accessible medium of claim 1, further comprising calculating a performance value for a training classifier trained using the dual-class dataset.

12. The non-transitory computer-accessible medium of claim 11, wherein the performance value is an area under a curve, an accuracy rate, a precision rate or a recall rate.

13. A non-transitory computer-accessible medium having stored thereon computer-executable instructions for detecting a fraudulent transaction, wherein, when a computing hardware arrangement executes the instructions, the computing arrangement is configured to perform procedures comprising:
receiving, from a terminal, data relating to a transaction;
provide the data to a fraud detection model as an input;
receiving an output from the fraud detection model, the output indicating whether the transaction is fraudulent;
transmitting the output to the terminal;
wherein the fraud detection model is trained using a dual-class dataset generated using the following steps:
a. accessing a first dataset including data points belonging to a first category of data points, wherein each data point in the first dataset is labeled as a first class data point;
b. accessing a second dataset including data points belonging to the first category of data points and a second category of data points, wherein each data point in the second dataset is labeled as a second class data point;
c. training a classification model using the first dataset and the second dataset;
d. using the classification model, classifying each data point in the second dataset as belonging to one of the first category of data points or the second category of data points;
e. for each data point in the second dataset classified as belonging to the first category of data points, removing the data point from the second dataset, adding the data point to the first dataset and labelling the data point as the first class data point;
f. repeating steps (c)-(e), until the classification model does not classify any data point in the second dataset classified as belonging to the first category of data points; and
g. generating the dual-class dataset using the first dataset and the second dataset.

14. The non-transitory computer-accessible medium of claim 13, wherein the first dataset includes data points representing fraudulent credit card transactions.

15. The non-transitory computer-accessible medium of claim 14, wherein the second dataset includes data points representing credit card transactions.

16. The non-transitory computer-accessible medium of claim 13, further comprising sampling the dual-class dataset according to a sampling technique.

17. A computing device comprising:
a processor and a memory, wherein:
the memory is configured to store:
a first dataset including data points belonging to a first category of data points, wherein each data point in the first dataset is labeled as a first class data point; and
a second dataset including data points belonging to the first category of data points and a second category of data points, wherein each data point in the second dataset is labeled as a second class data point;
the processor is configured to:
train a classification model using the first dataset and the second dataset;
using the classification model, classify each data point in the second dataset as belonging to one of the first category of data points or the second category of data points;
for each data point in the second dataset classified as belonging to the first category of data points, remove the data point from the second dataset, add the data point to the first dataset and label the data point as the first class data point;
repeat the training, classification, removal, addition and labelling, until the classification model does not classify any data point in the second dataset classified as belonging to the first category of data points; and
generate a dual-class dataset using the first dataset and the second dataset.

18. The computing device of claim 17, wherein the computing device is configured to:
receive, from a terminal, data relating to a transaction;
provide the data to a fraud detection model as an input;
receiving an output from the fraud detection model, the output indicating whether the transaction is fraudulent; and
transmitting the output to the terminal.

19. The computing device of claim 17, wherein the first dataset includes data points representing fraudulent credit card transactions.

20. The computing device of claim 17, wherein the second dataset includes data points representing credit card transactions.

* * * * *